(12) United States Patent
Šopík

(10) Patent No.: US 12,401,666 B2
(45) Date of Patent: Aug. 26, 2025

(54) MALWARE DETECTION AND MITIGATION SYSTEMS AND METHODS

(71) Applicant: Avast Software s.r.o., Prague (CZ)

(72) Inventor: Břetislav Šopík, Brno (CZ)

(73) Assignee: Avast Software s.r.o., Prague (CZ)

( * ) Notice: Subject to any disclaimer, the term of this patent is extended or adjusted under 35 U.S.C. 154(b) by 172 days.

(21) Appl. No.: 18/472,620

(22) Filed: Sep. 22, 2023

(65) Prior Publication Data
US 2025/0106225 A1    Mar. 27, 2025

(51) Int. Cl.
*H04L 9/40* (2022.01)

(52) U.S. Cl.
CPC ...... *H04L 63/1416* (2013.01); *H04L 63/1425* (2013.01)

(58) Field of Classification Search
CPC .................. H04L 63/1416; H04L 63/1425
USPC .................................................. 726/1
See application file for complete search history.

(56) References Cited

U.S. PATENT DOCUMENTS

| | | | | |
|---|---|---|---|---|
| 8,224,761 | B1 * | 7/2012 | Rockwood | H04L 63/0263 709/224 |
| 10,565,376 | B1 * | 2/2020 | Jung | G06F 11/302 |
| 10,628,586 | B1 * | 4/2020 | Jung | G06F 11/3037 |
| 11,012,472 | B2 * | 5/2021 | Milazzo | H04L 63/1425 |
| 11,036,867 | B2 * | 6/2021 | Bhatia | H04L 63/1433 |
| 11,330,016 | B2 * | 5/2022 | Arbel | H04L 63/20 |
| 11,899,824 | B1 * | 2/2024 | Hall | G06F 21/6227 |
| 12,223,044 | B1 * | 2/2025 | Jung | G06F 21/564 |
| 12,271,690 | B2 * | 4/2025 | Mahindru | G06N 20/00 |
| 2015/0205964 | A1 * | 7/2015 | Eytan | G06F 21/566 726/23 |
| 2017/0126708 | A1 * | 5/2017 | Eytan | H04L 63/145 |
| 2017/0132415 | A1 * | 5/2017 | Eytan | H04L 63/1441 |
| 2018/0253554 | A1 * | 9/2018 | Eytan | H04L 63/1425 |
| 2020/0104499 | A1 * | 4/2020 | Eytan | G06F 21/566 |
| 2020/0213359 | A1 * | 7/2020 | Arbel | H04L 63/20 |
| 2020/0272741 | A1 * | 8/2020 | Bhatia | G06F 40/284 |
| 2021/0232643 | A1 * | 7/2021 | Ricci | B60R 25/25 |
| 2021/0250364 | A1 * | 8/2021 | Webster | G06F 21/566 |
| 2023/0004639 | A1 * | 1/2023 | Idrizovic | G06F 21/566 |
| 2023/0131525 | A1 | 4/2023 | Sopik et al. | |
| 2023/0418943 | A1 * | 12/2023 | Han | G06N 20/00 |

(Continued)

OTHER PUBLICATIONS

Břetislav Šopík, Fabrizio Biondi, Jakub Křoustek, Olga Petrova, Data File Behavioral Feature Reporting Methodology Flow Diagram, Avast Software s.r.o., Prague, Czech Republic, Jan. 2, 2020.

*Primary Examiner* — Tauqir Hussain
(74) *Attorney, Agent, or Firm* — Dovas Law, P.C.

(57) ABSTRACT

An electronic threat mitigation method is provided. A first rule for identifying application code is obtained, and a rule update for identifying application code is generated. An abstract syntax tree of the first rule is generated, the abstract syntax tree including a plurality of nodes. The rule update is incorporated into a first node of the plurality of nodes to generate a second rule for identifying application code, the first node at a first depth on the abstract syntax tree. The second rule is applied to a plurality of application code samples to determine a coverage of the second rule, and the first rule is updated as the second rule based on the coverage of the second rule and the first depth. A notification is provided or a data file is disabled, blocked, or deleted based on application of the second rule.

17 Claims, 7 Drawing Sheets

(56) References Cited

U.S. PATENT DOCUMENTS

| | | | |
|---|---|---|---|
| 2024/0248988 A1* | 7/2024 | Taylor | G06F 21/564 |
| 2024/0259407 A1* | 8/2024 | Philip | H04L 63/1425 |
| 2024/0281531 A1* | 8/2024 | Taylor | G06F 21/564 |
| 2025/0016185 A1* | 1/2025 | Han | G06F 40/279 |

* cited by examiner

```
EXAMPLE RULE 200 import pe
rule rule_example
{
   meta:
      strain = "StrainName"
      author = "AuthorName"
   strings:
      $s00 = "String00"
      $s01 = "String01"
      $s10 = "String10"
      $s11 = "String11"
   condition:
      EXE and (
         pe.imphash() = "ImportHash"
or
         any of ($s0*) or
         all of ($s1*)
      )
}
```

FIG. 2

MALWARE DETECTION AND MITIGATION SYSTEMS AND METHODS

FIELD OF INVENTION

The invention relates generally to malware detection, and more particularly to malware detection rules.

BACKGROUND

In the malware industry, rules are generated and updated for the purpose of identifying and mitigating malware threats. YARA ("Yet Another Recursive/Ridiculous Acronym") rules for instance are a popular format for storing malware threat intelligence in a form that is both understandable by humans and actionable by artificial intelligence ("AI") systems. YARA rules can utilize various types of features, the two most important classes of which are static and dynamic features. The discriminating power, costs, and ease of obtaining of these two types of features differ significantly. Therefore, it is a common practice to cover each malware strain by an ensemble of multiple YARA rules, or alternatively other rule protocol, where every rule utilizes only one type of the features (i.e., static or dynamic). This increases the total versatility of a ruleset. It is of crucial importance for an entity managing a particular ruleset to keep the ruleset fit by updating. As new variants of a particular malware strain appear, current rules of a ruleset become obsolete and need to be updated.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A method for updating a rule for identifying application code is provided. A first rule for identifying application code is obtained, and a rule update for identifying application code is generated. An abstract syntax tree of the first rule is generated, the abstract syntax tree including a plurality of nodes. The rule update is incorporated into a first node of the plurality of nodes to generate a second rule for identifying application code, the first node at a first depth on the abstract syntax tree. The second rule is applied to a plurality of application code samples to determine a coverage of the second rule, and the first rule is updated as the second rule based on the coverage of the second rule and the first depth.

An electronic threat mitigation method is provided in which network communications of one or more computing devices are monitored. A first data file is extracted based on the monitoring of the network communications of the one or more computing devices. A first rule for identifying application code is applied to the first data file to determine a non-match by the first rule to the first data file, the first rule comprising a plurality of terms and one or more operators. A second rule for identifying application code is applied to the first data file to determine a match by the second rule to the first data file. A rule update for identifying application code is generated based at least on the determining the non-match by the first rule to the first data file and the determining the match by the second rule to the first data file. An abstract syntax tree of the first rule is generated, the abstract syntax tree comprising a plurality of nodes comprising the plurality of terms and the one or more operators. The rule update is incorporated into a first node of the plurality of nodes to generate a third rule for identifying application code, the first node at a first depth on the abstract syntax tree. The third rule is applied to a plurality of application code samples to determine a coverage of the third rule. Network communications of a particular computing device are monitored. A second data file is extracted based on the monitoring of the network communications of the particular computing device. Based at least on the coverage of the third rule and the first depth, the third rule is applied to the second data file to determine a match by the third rule to the second data file. An action is performed via the particular computing device including one or more of providing a notification, disabling the second data file, blocking the second data file, or deleting the second data file based on the determining the match by the third rule to the second data file.

A system is provided including one or more processors and memory storing executable instructions that, as a result of being executed, cause the system to perform operations. The operations include monitoring network communications, extracting a first data file via the monitoring, and applying a first rule for identifying application code to the first data file to determine a non-match by the first rule to the first data file, the first rule comprising a plurality of terms and one or more operators. The operations also include applying a second rule to the first data file to determine a match by the second rule to the first data file, generating a rule update for identifying application code based at least on the determining the non-match by the first rule to the first data file and the determining the match by the second rule to the first data file, and generating an abstract syntax tree of the first rule, the abstract syntax tree comprising a plurality of nodes comprising the plurality of terms and the one or more operators. The operations further include incorporating the rule update into a first node of the plurality of nodes to generate a third rule for identifying application code, the first node at a first depth on the abstract syntax tree, and applying the third rule to a plurality of application code samples to determine a coverage of the third rule. The operations further include extracting a second data file via the monitoring, applying, based at least on the coverage of the third rule and the first depth, the third rule to the second data file to determine a match by the third rule to the second data file. The operations further include one or more of providing a notification, disabling the second data file, blocking the second data file, or deleting the second data file based on the determining the match by the third rule to the second data file.

A non-transitory computer-readable storage medium is provided storing executable instructions that, as a result of execution by one or more processors of a computer system, cause the computer system to monitor network communications, extract a first data file via the monitoring, and apply a first rule for identifying application code to the first data file to determine a non-match by the first rule to the first data file, the first rule comprising a plurality of terms and one or more operators. The computer system is also caused to apply a second rule to the first data file to determine a match by the second rule to the first data file, generate a rule update for identifying application code based at least on the determining the non-match by the first rule to the first data file and the determining the match by the second rule to the first data file, and generate an abstract syntax tree of the first rule, the abstract syntax tree comprising a plurality of nodes comprising the plurality of terms and the one or more operators. The rule update is incorporated into a first node of the plurality of nodes to generate a third rule for identifying application code, the first node at a first depth on the abstract syntax tree. The third rule is applied to a plurality of application code samples to determine a coverage of the third rule. A second data file is extracted via the monitoring, and the third rule is applied, based at least on the coverage of the third rule and the first depth, to the second data file to determine a match by the third rule to the second data file. An action is performed via the particular computing device including one or more of providing a notification, disabling the second data file, blocking the second data file, or deleting the second data file based on the determining the match by the third rule to the second data file.

BRIEF DESCRIPTION OF THE DRAWINGS

A more detailed understanding may be had from the following description, given by way of example with the accompanying drawings. The Figures in the drawings and the detailed description are examples. The Figures and the detailed description are not to be considered limiting and other examples are possible. Like reference numerals in the Figures indicate like elements wherein:

FIG. 2 shows a hypothetical example YARA rule including its condition and terms.

DETAILED DESCRIPTION OF ILLUSTRATIVE EMBODIMENTS

Herein described are systems and methods directed at solving the problem of keeping a ruleset for detecting malware threats fit by systematically discovering obsolete rules in strain-specific ensembles of rules and generating appropriate updates for the obsolete rules.

Terms set forth herein are described as follows:

"Recall" is the ability of a classifier or model to determine all relevant cases within a data set. "Recall" is mathematically defined as the number of true positives divided by the sum of the number of true positives and the number of false negatives.

"Precision" is the ability of a classifier or model to identify only the relevant data points. "Precision" is mathematically defined as the number of true positives divided by the sum of the number of true positives and the number of false positives.

As described herein, reference to "first," "second," "third," and "fourth" components (e.g., a "first term," a "second rule") or "particular" or "certain" components or implementations (e.g., a "particular computing device," a "particular term," a "particular implementation") is not used to show a serial or numerical limitation or a limitation of quality but instead is used to distinguish or identify the various components and implementations.

Figure 1:
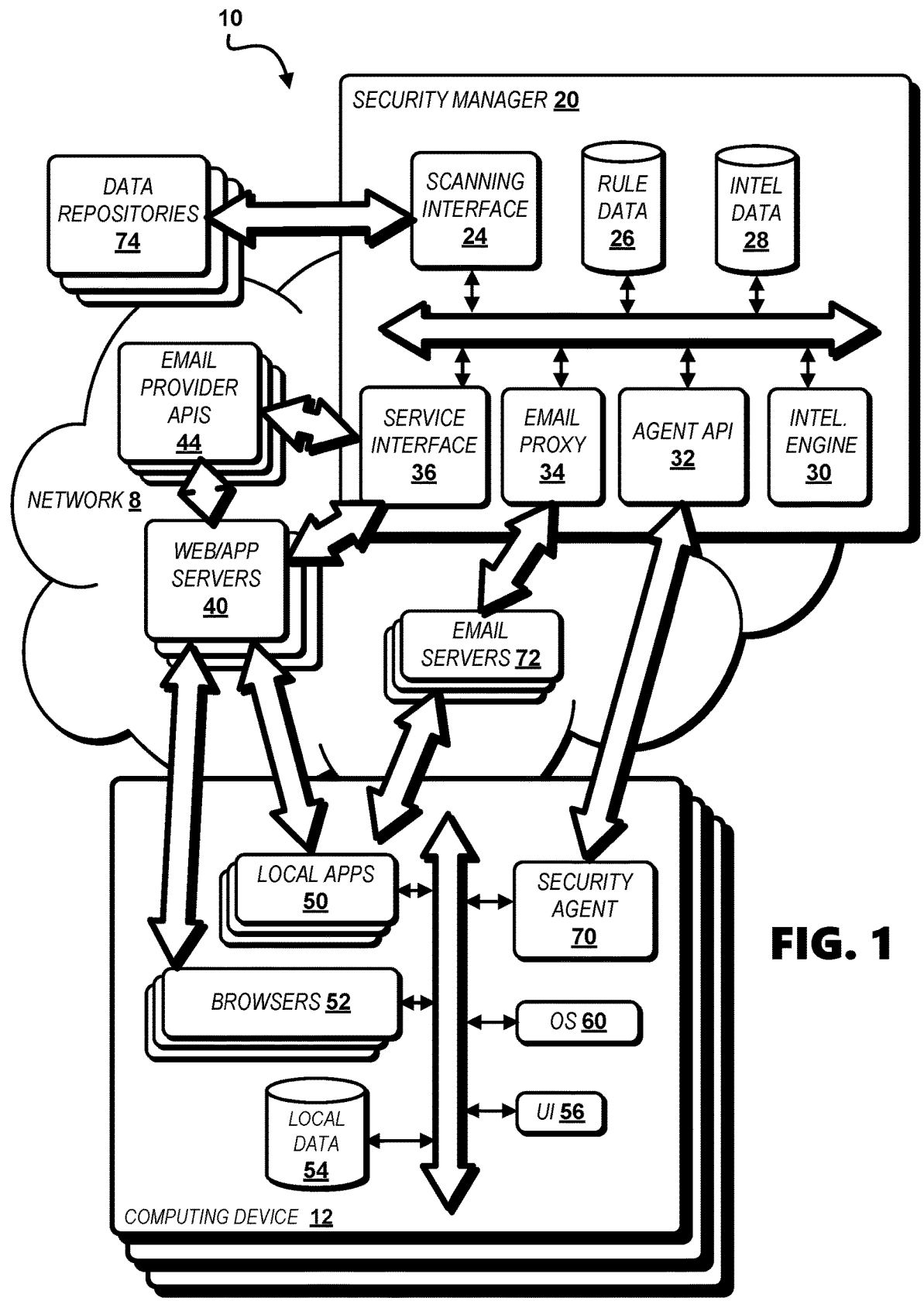
FIG. 1 shows an environment in which data files are aggregated and evaluated for updating rulesets for detecting malware and in which updated rulesets are applied to malware threats encountered by computing devices.
Figure 3:
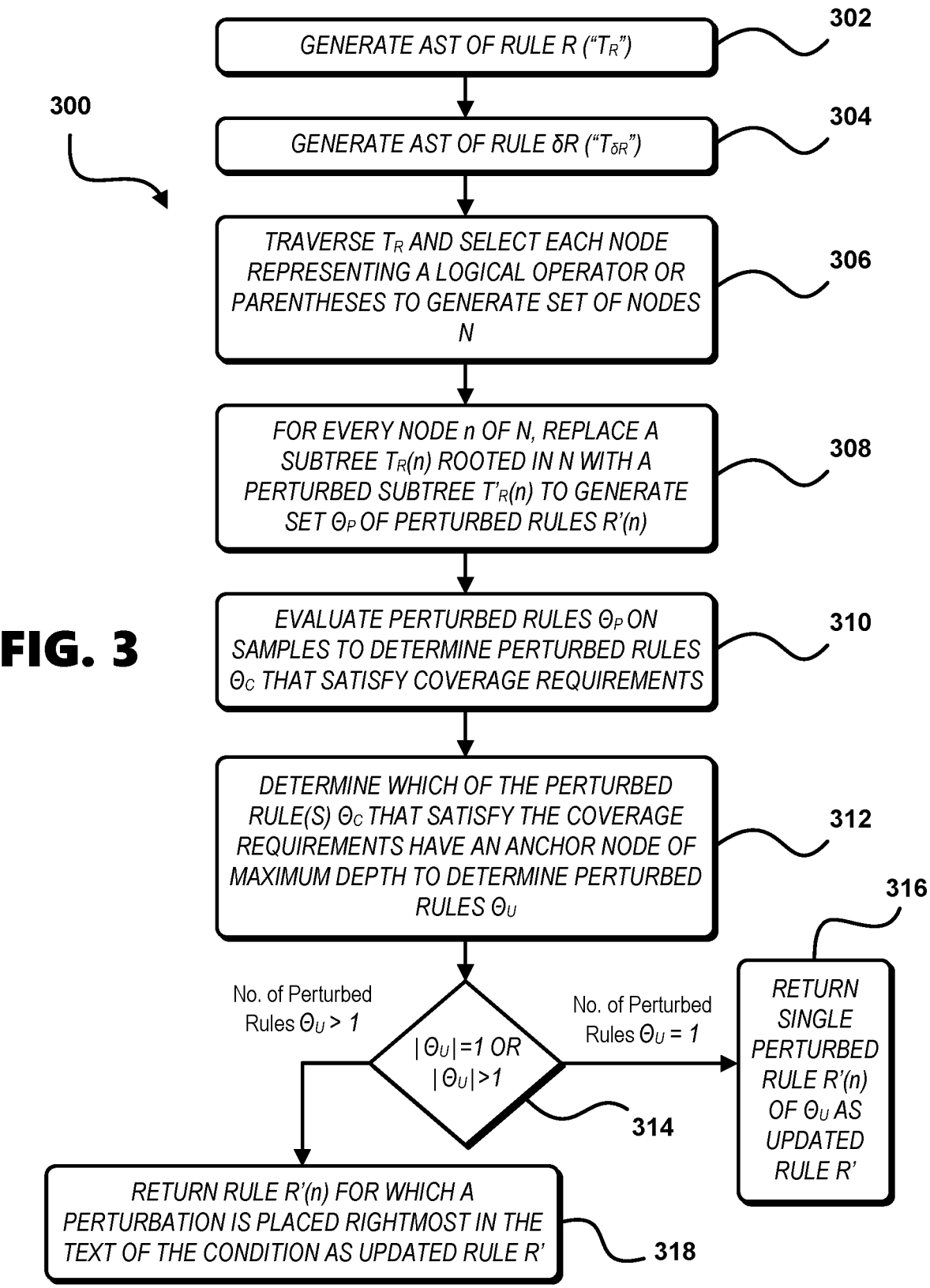
FIG. 3 is a diagram showing a process for updating a rule for identifying malware application code.

Referring to FIG. 1, an environment 10 enabled by a computer network 8 is illustrated in which a network-connectable processor-enabled security manager 20 generates and updates rules used for detecting threats to computing devices 12. The computer network 8 includes one or more wired or wireless networks or a combination thereof, for example a local area network (LAN), a wide area network (WAN), the internet, mobile telephone networks, and wireless data networks such as Wi-Fi™ and 3G/4G/5G cellular networks. A security agent 70 enables monitoring of use of a computing device 12, including messages, message attachments, and downloads to the computing device 12 as well as the browsing history and clickstream of a user on the computing device 12. The monitoring by the security agent 70 provides the security manager 20 with intelligence data including data files and ordered sequences of hyperlinks followed by a user at one or more websites or other network destinations, which data is beneficially stored in de-identified form in an intelligence datastore 28.

Web or application ("web/app") servers 40 can function to enable local applications 50 or components of local applications 50. The web/app servers 40 can further enable online services including network-based applications, webpages, electronic message provider systems (e.g., email provider systems), or other online services accessible via a browser application, ("browser") 52 or via a local application 50. A user is enabled to engage an online service enabled by a web/app server 40 for example by registering a user account for which account credentials (e.g., username, password) are created by the user or an administrator of the service. The security manager 20 can gather intelligence data in the form of data files and content from web/app servers 40 via a service interface 36, which data is stored in the intelligence datastore 28. The security manager 20 can further gather intelligence data in the form of data files and content from network-accessible third-party data repositories 74 via a scanning interface 24, which data is also stored in the intelligence datastore 28.

The security manager 20 is coupled to a computing device 12 and enables threat detection and mitigation to be provided to the computing device 12 via a security agent 70. The security agent 70 monitors user activity on the computing device 12 including messaging (e.g., email and text messaging), use of local and network-based applications, and access of websites and of particular content on local and network-based applications and websites, which data is fed to the security manager 20 via an agent application program interface ("API") 32 and stored in the intelligence datastore 28, and which data is used in threat detection and mitigation.

The security agent 70 can be provided integral with or as an extension or plugin to one or more browser applications 52 ("browsers") and with one or more local applications 50 and provides notices to a user via a user interface 56 of the computing device 12. The security agent 70 gathers user actions including logins, browsing history, and clickstreams from a browser 52 with which it is integrated or in communication with, which data is transmitted to the security manager 20 via the agent API 32 and stored in the intelligence datastore 28. The security manager 20 provides threat information to the security agent 70 via the agent API 32 for enabling the security agent 70 to provide notifications to a user and to filter and block network-based threats confronted by a browser 52, which threat information can be stored in a local datastore 54.

The security agent 70 engages with local applications 50, for example standalone applications, plugins, add-ons, or extensions to existing applications, to manage threats confronted by the local applications 50. The local applications 50 can include for example email clients or clients for other messaging protocols. Threats can include malicious emails including malicious attachments or links to malicious data on a network (e.g., the internet). The security agent 70 monitors actions performed via the local applications 50 including logins to online services (e.g., electronic messaging applications) enabled by the local applications 50 to collect data which is transmitted to the security manager 20 via the agent API 32 and stored in the intelligence datastore 28. An operating system 60 (hereinafter "OS 60") is executed on the computing device 12 which enables integration of the security agent 70 with the browsers 52 and local applications 50.

The security manager 20 aggregates electronic message data from a plurality of computing devices 12 via the security agent 70 which is executed on the plurality of computing devices 12. The security agent 70 monitors communications via the one or more local applications 50 including for example email clients and messaging applications. The security agent 70 monitors via the browser 52 communications including user activity on network-based applications and websites enabled by the web/app servers 40 including browser-based email services (e.g., GMAIL™, YAHOO MAIL™) for example enabled by email providers. Monitored data is stored in the local datastore 54, is fed by the security agent 70 to the security manager 20 via the agent API 32, and is stored in the intelligence datastore 28, beneficially in de-identified form. The agent API 32 communicates with the security agent 70 via the computer network 8. Alternatively, the security manager 20 can be provided as an application on the computing device 12, for example as an integration or extension to a browser 52, and the security agent 70 can communicate locally with the security manager 20 via the agent API 32 on the computing device 12.

As indicated above, the security agent 70 can be provided integral with or as an extension or plugin to one or more local applications 50 (e.g., electronic messaging applications, email clients) and one or more one or more browsers 52 and provides notices to a user via a user interface 56. The security agent 70 monitors emails and other electronic communications from and to the local applications 50 and the browsers 52. The security manager 20 provides information for identifying threats to the security agent 70 via the agent API 32 for enabling the security agent 70 to provide notifications to a user and to filter or remove threats confronted by the local applications 50 and browsers 52. Threats can include electronic messages or downloads including malicious code or links to network destinations including malicious code. The security agent 70 is executed on a plurality of computing devices 12 of a plurality of users allowing aggregation by the security manager 20 of de-identified data from the plurality of computing devices 12.

The service interface 36 of the security manager is configured to connect to email provider application program interfaces ("APIs") 44, each enabled to connect to a corresponding email provider system enabled by a web/app server 40. A user provides email service login credentials to the security manager 20, for example via the security agent 70. The security manager 20 through the service interface 36 monitors emails sent by and received by the user via the email provider API 44 by applying the email service login credentials of the user.

The security manager 20 further includes an email proxy 34 which enables a proxy email address of a user which receives email on behalf of the user. The email proxy 34 detects and filters or removes threats (e.g., a data file including malicious application code) in received emails, forwards received emails (before or after filtering or removing the threats) to another email address in use by the user, and provides notifications (e.g., alerts) to users regarding threats in forwarded emails. The email proxy 34 can host the proxy email address and the other email address to which the received emails are forwarded. Alternatively, the user can retrieve an email from the user's proxy email address directly, before or after the email proxy 34 filters or removes one or more threats from the email. The email proxy 34 can deliver emails to a user via email servers 72 directed to a local application 50 (e.g., an email client) or to a user through a web interface accessible by the user via a browser 52.

The security manager 20, via the service interface 36 or the email proxy 34, and the security agent 70 and are each configured to perform processes for removing threats (e.g., data files including malicious application code, URL links to malicious application code) from electronic messages (e.g., emails), for providing notifications regarding threats in electronic messages, and for filtering, blocking, or re-routing electronic messages including threats. Described herein are processes implemented by one or both the security manager 20 or the security agent 70, the processes pertain to rules used for detecting electronic threats (e.g., YARA rules). In the cyber security industry, YARA rules are often used for detecting malicious files and storing threat intelligence. The operational part of the YARA rule is called a condition. It is a Boolean function whose arguments are terms that check for value or presence of various features. Referring to FIG. 2, a hypothetical example YARA rule 200 including its condition and terms is shown. The rule 200 utilizes the private rule EXE and also an imported hash function ("imphash") of a WINDOWS™ Portable Executable ("PE") module in its condition. In order to focus on structure of the condition of the rule 200, in an illustrative example the condition's terms are represented by generic placeholders as $R_{200}=t_1 \wedge (t_2 \vee t_3 \vee t_4)$, where $t_1$, $t_2$, $t_3$, and $t_4$ are each a term.

When assembling threat intelligence about a malware strain, it is important to cover the strain by multiple rules (e.g., multiple YARA rules). Such a strategy has multiple benefits. An ensemble of classifiers tends to outperform a single classifier, for example a YARA rule which can be perceived as a binary classifier. Further, covering a strain by multiple rules provides a safety measure for discovering new variants of a malware strain that are not too novel, and covering a strain by multiple rules may provide feedback about the necessity to update a certain rule.

It is beneficial to clearly distinguish between malware strains in the generation of rules. Particularly, it is beneficial that created rules each match only a specific target strain. Rule updates which match multiple malware strains create overlaps in threat detection which may potentially grow with successive rule updates, wherein after a sufficient number of successive overlapping rule updates an inseparable mix of catch-all rules may be created, impeding the ability to aggregate valuable threat intelligence and the ability to track down specific malware strains by applied rules.

In an example implementation of herein described methods, a set of available samples, for example WINDOWS™ Portable Executable ("PE") files, are depicted as Q in an equation 1. A subset of samples $\Omega_C$ are labeled as clean based on a known benign nature of the subset of samples $\Omega_C$ as depicted in the equation 1. Clean ("benign") samples $\Omega_C$ are not matched by any rule for any strain.

$$\Omega_C = \{S \in \Omega: S \text{ is a trusted clean sample}\} \quad \text{Eq. 1}$$

For a malware strain $\phi$ covered by an ensemble $E_\phi$ of rules. A subset of samples $\Omega_\phi$ labeled as having been infected by the malware strain $\phi$ are provided in equation 2.

$$\Omega_\phi = \{S \in \Omega: \exists R \in E_\phi: R(S) = \text{True}\} \quad \text{Eq. 2}$$

In equation 2, R(S) represents an act of evaluating the rule R (e.g., a binary classifier) on features of sample S. In a situation where a new malware variant $\phi'$ of the malware strain $\phi$ is distributed which manages to avoid one rule of the ensemble $R \in E_\phi$, and the rest of the rules $E_\phi/R$ supplement the avoided rule R to detect malicious samples infected by the malware variant $\phi'$ in one or more cases, valuable feedback is provided. The feedback indicates that the avoided rule R needs to be updated to an updated rule R' in order to detect malicious samples infected by the malware variant $\phi'$ that avoided any detection by the rule R. The set of samples that managed to evade the rule R but were detected by one or more of the rules $\tilde{R}$ in $E_\phi/R$ are labeled as suspicious samples with reference to the rule R and are defined formally as $\Omega_{S(E_\phi,R)}$ as set forth in equation 3.

$$\Omega_{S(E_\phi,R)} = \{S \in \Omega: R(S) = \text{False} \land \exists \tilde{R} \in E_\phi \setminus R: \tilde{R}(S) = \text{True}\} \quad \text{Eq. 3}$$

The suspicious samples $\Omega_{S(E_\phi,R)}$ serve as a source for a rule update $\delta R$ of the rule R, the rule update $\delta R$ including a condition, for example the condition including the terms set forth in the example rule 200. An example process for determining a rule update was a subject of U.S. patent application Ser. No. 17/512,015. Having determined the rule update $\delta R$, it is disclosed herein a processes of incorporating the condition of the rule update $\delta R$ into the condition of the original rule R. Processes described herein may depend on assumptions about the nature of rule ensembles, coverage of respective rules, and the nature of rules' conditions. It follows that a sample that is determined to be malicious by the rule R and one or more of the rules $\tilde{R}$ in $E_{99}/R$ is designated as a non-suspicious (albeit malicious) sample with reference to the rule R.

For rules that form an ensemble covering a particular malware strain it is generally beneficial if each rule utilizes only one type of feature, for example a feature obtained from static analysis or a feature obtained from behavioral analysis of a malicious file. Utilizing one type of feature may have a positive impact on the applicability of the rules in an environment where each type of feature is associated with a different cost and speed of acquisition. It may also be beneficial to merge rules which use the same criterion or criteria for detection into a single unified rule.

In processes described herein, design patterns are assumed in which each rule utilizes only one type of feature and in which rules using the same criterion or criteria for detection are merged into a single unified rule. Particularly, it is implicitly assumed that the rule update $\delta R$ utilizes the same type of features and criterion or criteria for detection as the original rule R.

Further, in processes described herein, assumptions about the coverage of the rules are set forth in equations 4 through 7. In an assumption set forth in equation 4, the rule R does not match any of the suspicious samples.

$$\forall S \in \Omega_{S(E,R)}: R(S) = \text{False} \quad \text{Eq. 4}$$

In an assumption set forth in equation 5, the rule update $\delta R$ was created from suspicious samples and it matches all of the suspicious samples.

$$\forall S \in \Omega_{S(E,R)}: \delta R(S) = \text{True} \quad \text{Eq. 5}$$

In assumptions set forth in equations 6 and 7, both the rule R and the rule update $\delta R$ do not match any sample of other malware strains $\psi$ set forth in a subset of samples $\Omega_\psi$ labeled as being infected by the other malware strains $\psi$ $$\forall S \in \bigcup_{\psi \notin \{\phi,\hat{\phi}\}} \Omega_\psi: R(S) = \text{False} \quad \text{Eq. 6}$$

$$\forall S \in \bigcup_{\psi \notin \{\phi,\hat{\phi}\}} \Omega_\psi: \delta R(S) = \text{False} \quad \text{Eq. 7}$$

In assumptions set forth in equations 8 and 9, neither the rule R nor the rule update $\delta R$ match an available clean sample of a subset of samples $\Omega_C$ labeled as being clean, that is samples $\Omega_C$ that are not infected by malware.

$$\forall S \in \Omega_C: R(S) = \text{False} \quad \text{Eq. 8}$$

$$\forall S \in \Omega_C: \delta R(S) = \text{False} \quad \text{Eq. 9}$$

Based on the formal properties (5), (7), and (9) of $\delta R$ an updated rule R' which is a standalone rule is generated.

Assumptions about the nature of conditions of the rule R and the rule update $\delta R$ may be made. It may be assumed for example that the condition of the rule R was created manually or in semiautomated way and its structure has inherent value to a human analyst as it helps the human analyst to understand the logic of a detection better. It is common and it may be assumed that a condition's structure is such that terms with high recall and low precision are placed earlier in the text of the rule R, and terms with high precision and low recall are placed later in the text of the rule R.

It may be assumed that the condition of the rule update $\delta R$ is simpler than the condition of the rule R. Typically, the condition of the rule update $\delta R$ includes only a single term which checks for a unique value of a static or behavioral feature. Typically, the condition of the rule update $\delta R$ lacks the high recall terms present in the rule R as these are implicitly satisfied by the group of samples from which $\delta R$ was derived.

Based on the assumptions indicated herein, objectives are specified which describe illustrative properties of the updated rule R'. First, the updated rule R' obeys conditions set forth in equations 10 through 13.

As described by equation 10, the updated rule R' covers all samples covered by the original rule R.

$$\forall S \in \Omega: R(S) = \text{True} \Rightarrow R'(S) = \text{True} \quad \text{Eq. 10}$$

As described by equation 11, the updated rule R' covers all suspicious samples.

$$\forall\, S \in \Omega_{S(E,R)} : R'(S) = \text{True} \qquad \text{Eq. 11}$$

As described by equation 12, the updated rule R' does not match samples of other strains. As indicated above, it is beneficial that created rules each match only a specific target strain. Rule updates which match multiple malware strains create overlaps in threat detection which may potentially grow with successive updates impeding the ability to aggregate threat intelligence and the ability to identify specific malware strains by applied rules.

$$\forall\, S \in \bigcup_{\psi \notin \{\phi, \hat{\phi}\}} \Omega_\psi : R'(S) = \text{False} \qquad \text{Eq. 12}$$

As described by equation 13, the updated rule R' does not match any clean samples $\Omega_C$.

$$\forall\, S \in \Omega_C : R'(S) = \text{False} \qquad \text{Eq. 13}$$

From the assumption set forth above that the rule R was created manually or in semiautomated way and its structure has inherent value for a human analyst, it follows that it is a further objective to perturb the structure of the condition in the rule R as little as possible to retain its inherent value for the human analyst.

From the assumption that the condition of the rule update δR is simpler than the condition of the rule R, it follows that it is an objective to place the rule update δR within the condition of the rule R so that successful matching of the updated rule R' on a group of suspicious samples provides an evaluation of terms implicitly satisfied by the group of suspicious samples.

If there are two updated rules R' and R" which are equivalent with respect to the conditions set forth in equations 10, 11, 12, and 13, the updated rule R' or R" where the update is placed rightmost in the condition's text is preferred.

A process 300 is described herein which solves the problem of updating a rule R by the rule update δR under the assumptions and the objectives set forth above. It is beneficial to represent the condition of the rule R in the form of an abstract syntax tree ("AST"). In a step 302, an AST of the rule R is generated ("$T_R$"). In a step 304 an AST of the rule update δR is generated ("$T_{\delta R}$"). AST representations $T_R$ and $T_{\delta R}$ are provided based on the condition of the rule R and the condition of the rule update δR, respectively, and the updated rule R' is created as follows.

In a step 306, The AST of the rule R (i.e., $T_R$) is traversed and every node n that represents a logical operator (e.g., NOT, AND, OR) or a pair of parentheses is selected to generate a set of nodes which are labeled as a set of nodes N.

In a step 308, for every node n∈N, a subtree $T_R(n) \subseteq T_R$ rooted in n is located and replaced with a perturbed subtree $T'_R(n)$ as defined in Equation 14.

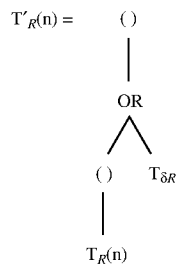

$$\text{Eq. 14}$$

By performing the replacement $T_R(n) \rightarrow T'_R(n)$ within $T_R$ in the step 308, a perturbed rule R'(n) is created with perturbation anchored in the node n. A set of all such perturbed rules $\Theta_P$ are labeled as set forth in equation 15.

$$\Theta_P = \{R'(n) : n \in N\} \qquad \text{Eq. 15}$$

In a step 310, coverage of the perturbed rules $\Theta_P$ are evaluated on available suspicious, clean, and malicious samples, and those perturbed rules $\Theta_P$ which satisfy requirements set forth in equations 10, 11, 12, and 13 are selected and set forth herein as selected perturbed rules $\Theta_C$. The set of selected perturbed rules $\Theta_C \subseteq \Theta_P$ are labeled as they are the candidates for the updated rule.

In a step 312, a set $\Theta_U \subseteq \Theta_C$ of one or more perturbed rules are created which have the anchoring node of a maximum depth $d_{max}$ as defined in equation 16.

$$\Theta_U = \{R'(n) \in \Theta_C : d(n) = d_{max}\} \qquad \text{Eq. 16}$$

Here d(n) is a function returning the depth of the anchoring node which is the number of edges from the root node. The maximum depth $d_{max}$ is defined in equation 17.

$$d_{max} = \max\{d(n) : R'(n) \in \Theta_C\} \qquad \text{Eq. 17}$$

All the perturbed rules in $\Theta_U$ are equivalent from the perspective of the herein described objectives. In step 314, it is determined if the number of perturbed rules of maximum depth $\Theta_U$ is equal to or greater than 1. If the number of perturbed rules of maximum depth is equal to 1, that is $|\Theta_U|=1$, the single rule in $\Theta_U$ is returned as the updated rule R' (step 316). If the number of perturbed rules of maximum depth are greater than 1, that is $|\Theta_U|>1$, the rule in $\Theta_U$ is returned for which the perturbation is placed rightmost in the text of the condition of the rule as the updated rule R' in accordance with the corresponding objective set forth above (step 318). For example, referring to FIG. 2, a perturbation placed rightmost in the condition text of the example rule 200 would be placed after the condition "all of ($s1*)". Returning a rule with the perturbation placed rightmost in the text of the condition of the rule provides a rule which for the perturbation is easily identified by a human analyst.

Presented herein is a solution to the problem of incorporating an update into a condition of a rule (e.g., a YARA rule) that reacts to a small variance of a malware strain which a target rule is supposed to cover. The solution is valid under specific assumptions and objectives defined herein that reflect particular needs of analysts who maintain a repository of rules. The chosen form of the rule's perturbation set forth in equation 14 is a heuristic solution to a requirement to perturb the structure of the condition as little as possible as set forth in an objective above. The perturbation template contains parentheses which may be redundant and can be removed in further post-processing. The set of perturbed rules of maximum depth $\Theta_U$ defined in equation 16 is created to place the rule update δR within the condition of the rule R so that successful matching of the updated rule R' on a group of suspicious samples provides an evaluation of terms implicitly satisfied by the group of suspicious samples. In other words, if the rule R includes terms that are implicitly satisfied by the group of suspicious samples, the rule update SR should beneficially be placed within the condition of the rule R so that successful matching of the updated rule R' on suspicious samples is possible only if the updated rule R' allows for evaluation of the implicitly satisfied terms. For example, consider an original rule R having its condition in the form of "(DLL and 'condition terms no. 1') or 'condition terms no. 2''' where DLL is a YARA rule matching all DLL files. If all the suspicious samples are DLL files, then the rule update SR should be placed within a bracket together with "condition terms no. 1" to create the updated condition "(DLL and ('condition terms no. 1' or δR)) or 'condition terms no. 2'", because all suspicious samples implicitly satisfy the "DLL" term of the condition and the updated condition should allow for evaluation of the "DLL" term. In this example, if the suspicious samples are not all DLL files, then the rule update δR should be placed with "condition terms no. 2" to create the updated condition "(DLL and 'condition terms no. 1') or ('condition terms no. 2' or SR)", because it is a goal to cover all suspicious samples by the updated condition included in the updated rule R'.

A hypothetical example rule R is set forth in equation 18 for which a hypothetical example updated rule R' is generated pursuant to the process 300 with reference to equations 14-17.

$$R = t_1 \wedge (t_2 \vee t_3) \qquad \text{Eq. 18}$$

The exemplary rule R is represented by an abstract syntax tree ("AST") set forth in equation 19 where each node is labeled by an ID.

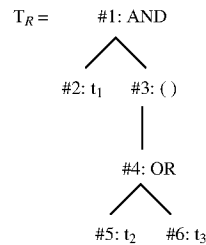

$$\text{Eq. 19}$$

For a hypothetical example rule update δR, in order to update the exemplary rule R by the hypothetical rule update δR, the process 300 is applied in view of the equations 14, 15, 16, and 17. A set of nodes N includes all nodes {#1, #2, #3, #4, #5, #6}. The perturbed rules from $\Theta_P$ are depicted in Table 1. The column "Node ID" represents labels of nodes from the set of nodes N. These nodes are the anchoring nodes of the rule's perturbation as defined in equation 14. The perturbations anchored in nodes #3 and #4 result in the same perturbed rules. Perturbations anchored in nodes #5 and #6 lead to equivalent rules also. It is assumed that the perturbed rules including the example rule update δR satisfy the coverage conditions of equations 10, 12, and 13. The last coverage condition to validate is the coverage of all suspicious samples of equation 11, which is shown in the third column of Table 1 as hypothetical matches on suspicious samples.

TABLE 1

| Node ID | Perturbed Rule | Matches on susp. samples |
|---|---|---|
| #1 | $(t_1 \wedge (t_2 \vee t_3)) \vee \delta R$ | 10 |
| #2 | $(t_1 \vee \delta R) \wedge (t_2 \vee t_3)$ | 10 |
| #3 | $t_1 \wedge ((t_2 \vee t_3) \vee \delta R)$ | 0 |
| #4 | $t_1 \wedge ((t_2 \vee t_3) \vee \delta R)$ | 0 |
| #5 | $t_1 \wedge ((t_2 \vee \delta R) \vee t_3)$ | 0 |
| #6 | $t_1 \wedge (t_2 \vee (t_3 \vee \delta R))$ | 0 |

It is shown that the only two perturbed rules covering all suspicious samples are those with perturbations anchored in nodes #1 and #2. These rules form a set of updated rule candidates $\Theta_C$. Out of the two perturbed rules in $\Theta_C$ the node #2 has larger depth as shown in the equation 19. The perturbed rule corresponding to node #2 is thus returned as the hypothetical example updated rule R' set forth in equation 20.

$$R' = (t_1 \vee \delta R) \wedge (t_2 \vee t_3) \qquad \text{Eq. 20}$$

Figure 4:
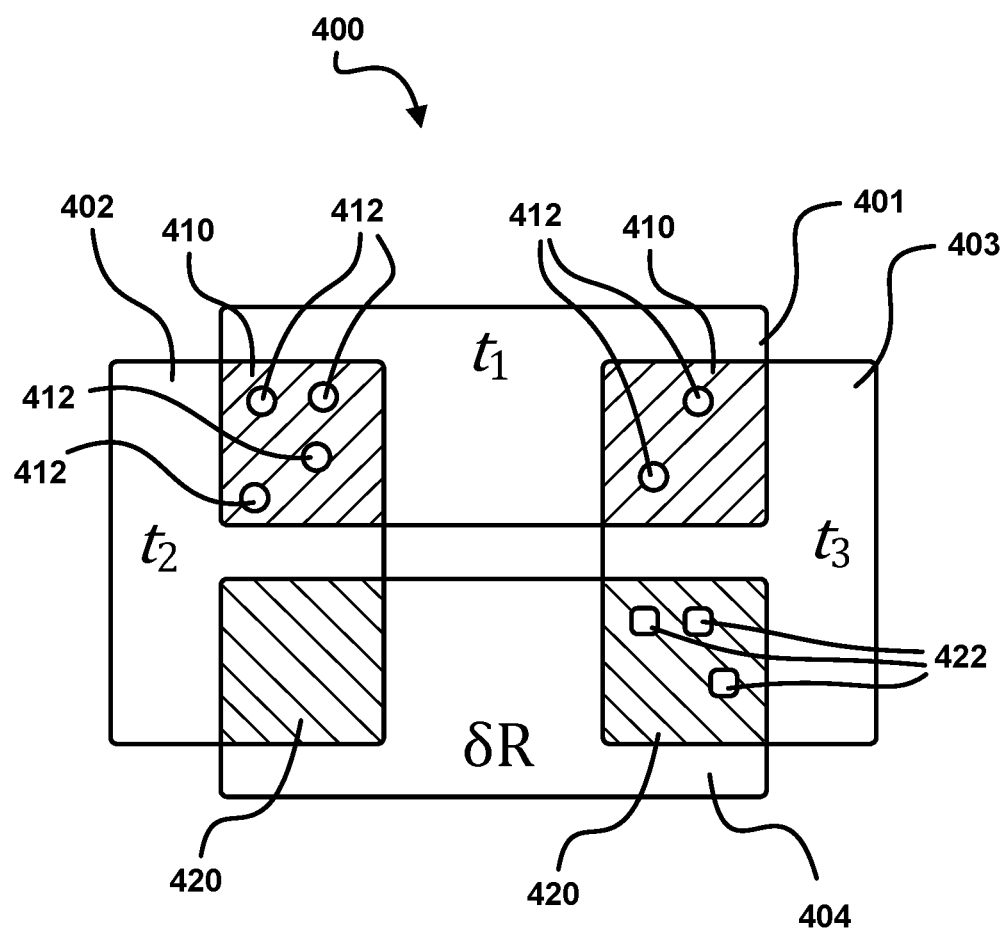
FIG. 4 is a diagram showing figurative intersections of terms in a hypothetical example updated rule.

The impact the constraints set forth above have on the generalization of the updated rule R' is described as follows with reference to the hypothetical exemplary updated rule R' as set forth in equation 20. Equation 20 is a result of updating the hypothetical example rule $R = t_1 \wedge (t_2 \vee t_3)$ of equation 18. by the hypothetical example rule update δR. The first term $t_1$, second term $t_2$, and third term $t_3$ are collectively referred to herein as terms $t_i$. Referring to FIG. 4, the intersections of the terms $t_i$ in the hypothetical example updated rule R' are diagrammatically illustrated as an intersection diagram 400. A first box 401 represents the first term $t_1$. A second box 402 represents the second term $t_2$. A third box 403 represents the third term $t_3$. A fourth box 404 represents the rule update δR. Original regions 410 represent matching intersections present in the original hypothetical example rule R, and update regions 420 represent matching intersections which emerged after the update. Round symbols 412 and square symbols 422 represent malware samples that are matched by the example updated rule R'. The round symbols 412 represent an original malware strain ϕ. The square symbols 422 represent a new malware variant ϕ' of the original malware strain ϕ (i.e., suspicious samples).

In the intersection diagram 400, all suspicious samples lie in the region defined by the matching intersection $t_3 \wedge \delta R$. Yet the updated rule has another valid matching intersection $t_2 \wedge \delta R$ for which there are no suspicious samples. The fact that the presented algorithm may produce an updated rule which generalizes beyond the direct evidence is not an error but a consequence of the goal to perturb the structure of the condition in R as little as possible to retain its inherent value for the human analyst. In order to make sure that the updated rule R' is reliable, strict assumptions are imposed on the quality of δR as set forth above in equations 4 through 9. The rule δR must be a reliable standalone rule itself.

Figure 5:
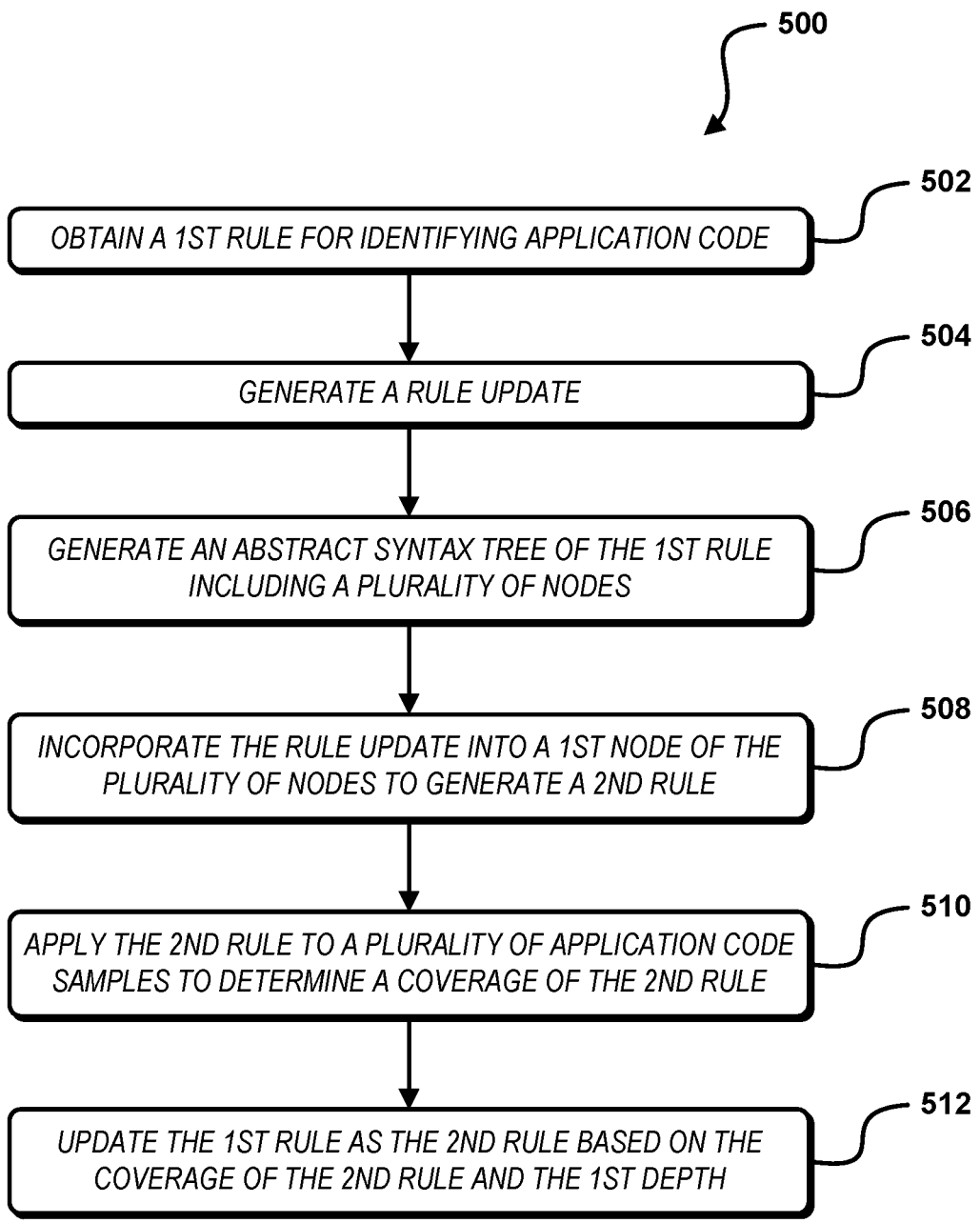
FIG. 5 is a diagram showing a method of updating a rule for identifying application code.

Referring to FIG. 5, a method 500 is shown in which a rule for identifying application code is updated. The method 500 is described with reference to the components of the environment 10 including the computing devices 12, security manager 20, email proxy 34, web/app servers 40, email provider APIs 44, email servers 72, and data repositories 74. Alternatively, the method 500 can be performed via other systems and is not restricted to being implemented by the components of the environment 10.

In a step 502, a first rule for identifying application code is obtained, and in a step 504 a rule update for identifying application code is generated. In an illustrative embodiment, the first rule is obtained from a rule datastore 26 of the security manager 20, and the rule update is generated responsive to intelligence received from one or more local applications 50 or browsers 52 of one or more computing devices 12 via the security agent 70, from one or more email provider APIs 44 or one or more web/app servers 40 via the service interface 36, or from the email proxy 34. An abstract syntax tree of the first rule is generated, the abstract syntax tree including a plurality of nodes (step 506). The rule update is incorporated into a first node of the plurality of nodes to generate a second rule for identifying application code, the first node at a first depth on the abstract syntax tree (step 508). The second rule is applied to a plurality of application code samples to determine a coverage of the second rule (step 510), and the first rule is updated as the second rule based on the coverage of the second rule and the first depth (step 512). Steps 506, 508, 510, and 512 are performed for example by the intelligence engine 30, and the second rule is used by the security agent 70, the email proxy 34, and the service interface 36 to provide electronic threat detection and mitigation.

The method 500 can also include incorporating the rule update into a second node of the plurality of nodes to generate a third rule for identifying application code, the second node at a second depth on the abstract syntax tree. The third rule is applied to the plurality of application code samples to determine a coverage of the third rule, and the first rule is updated as the second rule further based on the coverage of the third rule and the second depth. The method 500 can further include comparing the coverage of the second rule and the coverage of the third rule to determine the coverage of the second rule is equal to the coverage of the third rule, comparing the first depth to the second depth to determine the first depth is deeper than the second depth, and updating the first rule as the second rule further based on the determining the coverage of the third rule is equal to the coverage of the third rule and the determining the first depth is deeper than the second depth. The generating of the third rule and the comparing of the coverages and depths are performed for example by the intelligence engine 30. The plurality of application code samples are received for example from one or more of the security agent 70, scanning interface 24, service interface 36, or email proxy 34 and stored in the intelligence datastore 28. The plurality of application code samples can include a plurality of known infected samples and a plurality of known non-infected samples. The method 500 can moreover include determining the second rule matches the plurality of known infected samples and does not match the plurality of known non-infected samples to determine the coverage of the second rule, and determining the third rule matches the plurality of known infected samples and does not match the plurality of known non-infected samples to determine the coverage of the third rule.

In an extension to the method 500 network communications are monitored to detect a data file. The second rule is applied to the data file to determine a match, and an action is performed including one or more of providing a notification, disabling the data file, blocking the data file, or deleting the data file via a computing device based on the determining the match. The notifying, disabling, blocking, or deleting is performed for example by the security agent 70 via a local application 50 (e.g., email client, messaging application) or a browser 52 of the computing device 12. The notifying is enabled for example by the user interface 56 of the computing device 12. Alternatively, the notifying, disabling, blocking, or deleting is performed by the email proxy 34 or is performed by the service interface 36 via an email provider API 44 in communication with a web/app server 40.

Figure 6:
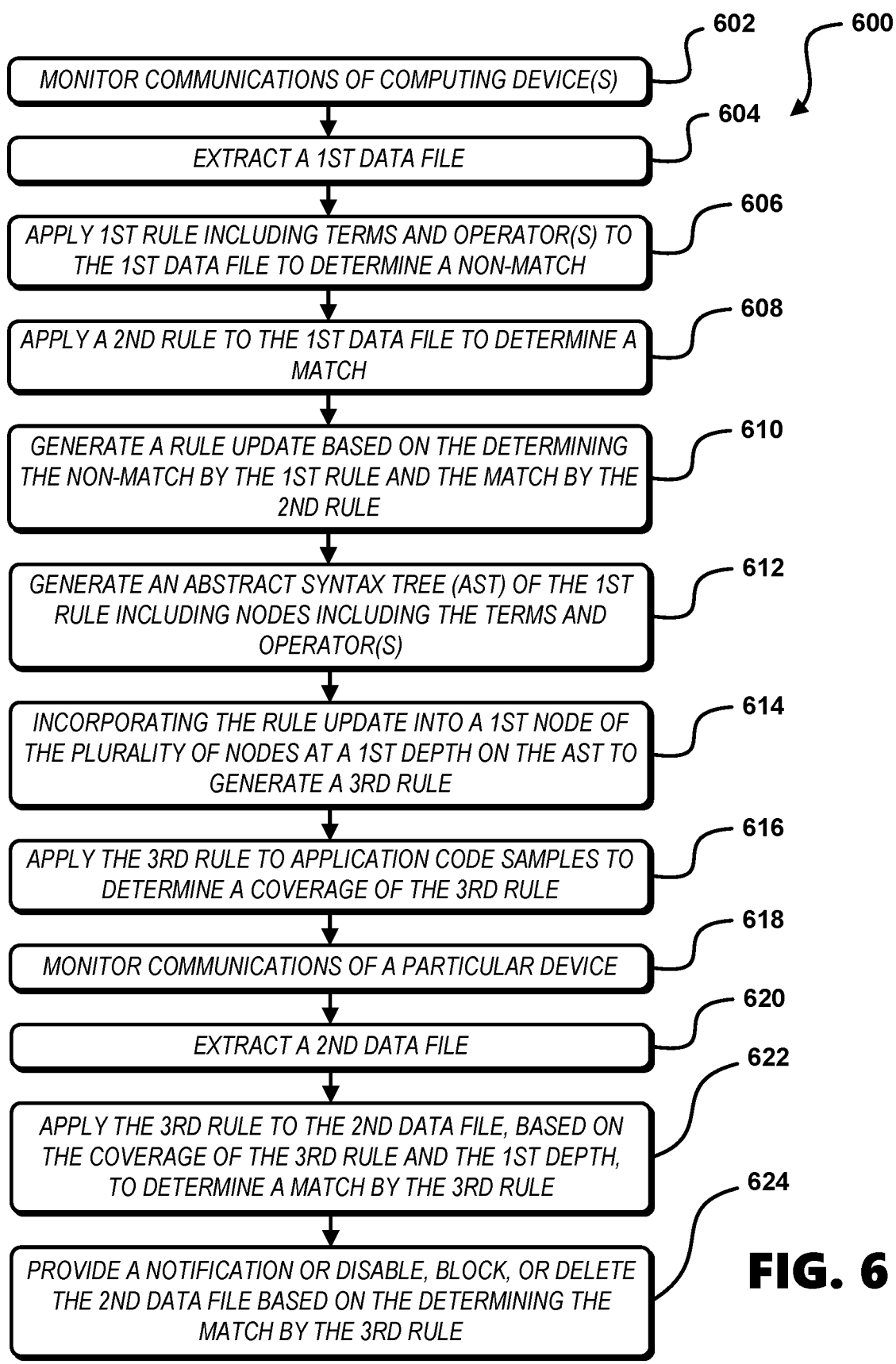
FIG. 6 is a diagram showing a method of updating a rule and applying an updated rule to extracted data files.

Referring to FIG. 6, a method 600 is shown in which one or more actions are performed based data files extracted based on monitored network communications. The method 600 is described with reference to the components of the environment 10, including the computing devices 12, security manager 20, email proxy 34, web/app servers 40, email provider APIs 44, email servers 72, and data repositories 74. Alternatively, the method 600 can be performed via other systems and is not restricted to being implemented by the components of the environment 10.

In a step 602 of the method 600 network communications of one or more computing devices are monitored. The one or more computing devices include for example one or more of the computing devices 12, web/app servers 40, email proxy 34, or email servers 72. The network communications of the one or more computing devices can include for example electronic messages or network downloads. In an illustrative embodiment, the network communications of the one or more computing devices are monitored via one or more of the computing devices 12, security manager 20, email proxy 34, service interface 36, web/app servers 40, email provider APIs 44, local applications 50 (e.g., email clients, messaging applications), browsers 52, security agents 70, or email servers 72. A first data file is extracted based on the monitoring of the network communications of the one or more computing devices (step 604). The data file can for example include an attachment to an electronic message or a network download received via one or more of the email proxy 34, service interface 36, web/app servers 40, email provider APIs 44, local applications 50 (e.g., email clients, messaging applications), browsers 52, security agents 70, or email servers 72. The data file can for example be extracted by the email proxy 34, by the service interface 36 from a web/app server 40 or an email provider API 44, or by the security agent 70 from a local application 50 or a browser 52. A first rule for identifying application code is applied to the first data file to determine a non-match by the first rule to the first data file, the first rule comprising a plurality of terms and one or more operators (step 606). A second rule for identifying application code is applied to the first data file to determine a match by the second rule to the first data file (step 608). The first rule and the second rule are applied for example by the security agent 70 to a first data file received via a local application 50 or a browser 52. Alternatively, the first rule and the second rule are applied by the email proxy 34 to a first data file received via the email proxy 34 or are applied by the service interface 36 to a first data file received from an email provider API 44 or a web/app server 40.

A rule update for identifying application code is generated based at least on the determining the non-match by the first rule to the first data file and the determining the match by the second rule to the first data file (step 610). An abstract syntax tree of the first rule is generated, the abstract syntax tree including a plurality of nodes including the plurality of terms and the one or more operators (step 612). The rule update is incorporated into a first node of the plurality of nodes to generate a third rule for identifying application code, the first node at a first depth on the abstract syntax tree (step 614). For example, in a case in which the first node comprises a particular term of the plurality of terms, the incorporating the rule update into the first node can include applying an OR operator between the particular term and the rule update. The third rule is applied to a plurality of application code samples to determine a coverage of the third rule (step 616). Steps 610, 612, 614, and 616 are performed for example by the intelligence engine 30 based on data stored in the intelligence datastore 28 or data received from one or more of the security agent 70, scanning interface 24, email proxy 34, or service interface 36. The application code samples are received for example from one or more of the security agent 70, scanning interface 24, email proxy 34, or service interface 36 and stored in the intelligence datastore 28.

Network communications of a particular computing device are monitored (step 618). The one or more computing devices can for example include the particular computing device. The particular computing device includes for example one or more of a computing device 12, a web/app server 40, the email proxy 34, or an email server 72. The network communications of the particular computing device include for example electronic messages or network downloads. In an illustrative embodiment, the network communications of the particular computing device are monitored via one or more of a computing device 12, the security manager 20, the email proxy 34, the service interface 36, web/app servers 40, an email provider API 44, local applications 50 (e.g., email clients, messaging applications), browsers 52, a security agent 70, or email servers 72. A second data file is extracted based on the monitoring of the network communications of the particular computing device (step 620). Based at least on the coverage of the third rule and the first depth, the third rule is applied to the second data file to determine a match by the third rule to the second data file (step 622). An action is performed via the particular computing device including one or more of providing a notification, disabling the second data file, blocking the second data file, or deleting the second data file based on the determining the match by the third rule to the second data file (step 624). The notifying, disabling, blocking, or deleting is performed for example by the security agent 70 via a local application 50 (e.g., email client, messaging application) or a browser 52 of the computing device 12. The notifying is enabled for example by the user interface 56 of the computing device 12. Alternatively, the notifying, disabling, blocking, or deleting is performed by the service interface 36 via an email provider API 44 in communication with a web/app server 40 or is performed by the email proxy 34.

The method 600 can also include incorporating the rule update into a second node of the plurality of nodes to generate a fourth rule for identifying application code, the second node at a second depth on the abstract syntax tree, applying the fourth rule to the plurality of application code samples to determine a coverage of the fourth rule, and applying, further based on the coverage of the fourth rule and the second depth, the third rule to the second data file to determine the match by the third rule to the second data file. The method 600 can further include comparing the coverage of the third rule and the coverage of the fourth rule to determine the coverage of the third rule is equal to the coverage of the fourth rule, comparing the first depth to the second depth to determine the first depth is deeper than the second depth, and applying, further based on the determining the coverage of the third rule is equal to the coverage of the fourth rule and the determining the first depth is deeper than the second depth, the third rule to the second data file to determine the match by the third rule to the second data file. The generating of the fourth rule and the comparing of the coverages and depths are performed for example by the intelligence engine 30.

The method 600 can further include extracting a plurality of data files including the first data file based on the monitoring of the network communications of the one or more computing devices, the plurality of data files including the plurality of application code samples. The plurality of data files can for example include attachments to electronic messages or network downloads received via one or more of the email proxy 34, service interface 36, web/app servers 40, email provider APIs 44, local applications 50 (e.g., email clients, messaging applications), browsers 52, security agents 70, or email servers 72. The plurality of data files can for example be extracted by the email proxy 34, by the service interface 36 from web/app servers 40 or email provider APIs 44, or from security agents 70 from local applications 50 or browsers 52. At least the second rule is applied to the plurality of data files to determine a plurality of matches by the at least the second rule to the plurality of application code samples, the plurality of matches including the match by the second rule to the first data file. The third rule is applied to the plurality of application code samples to determine a plurality of matches by the third rule to the plurality of application code samples, and the coverage of the third rule is determined based at least on the determining the plurality of matches by the third rule to the plurality of application code samples and the plurality of matches by the at least the second rule to the plurality of application code samples. For example, a plurality of rules including the second rule are applied to the plurality of data files to determine the plurality of matches by the at least the second rule to the plurality of application code samples. The plurality of rules are applied for example by the security agent 70 to a first data file received via a local application 50 or a browser 52. Alternatively, the plurality of rules are applied by the email proxy 34 to a first data file received via the email proxy 34 or are applied by the service interface 36 to a first data file received from an email provider API 44 or a web/app server 40.

The method 600 can further include extracting a plurality of data files, for example including the first data file, based on the monitoring of the network communications of the one or more computing devices, the plurality of data files including the plurality of application code samples, and the plurality of application code samples including at least a first sample that is not matched by the first rule and is matched by the second rule, at least a second sample that is matched by the first rule and is matched by the second rule, and at least a third sample that is not matched by the first rule and is not matched by the second rule. The third rule is applied to the plurality of application code samples to determine a match by the third rule to the at least the at least the first sample, a match by the third rule to the at least the second sample, and a non-match by the third rule to the at least the third sample. The coverage of the third rule is determined based at least on the match by the third rule to the at least the first sample, the match by the third rule to the at least the second sample, and the non-match by the third rule to the at least the third sample.

The method 600 can moreover include extracting a plurality of data files, for example including the first data file, based on the monitoring of the network communications of the one or more computing devices, the plurality of data files including the plurality of application code samples. The first rule and the second rule are applied to the plurality of data files to determine first samples of the plurality of application code samples that are not matched by the first rule and are matched by the second rule, to determine second samples of the plurality of application code samples that are matched by the first rule and are matched by the second rule, and to determine third samples of the plurality of application code samples that are not matched by the first rule and are not matched by the second rule. The third rule is applied to the plurality of application code samples to determine a plurality of matches by the third rule to the first samples, a plurality of matches by the third rule to the second samples, and a plurality of non-matches by the third rule to the third samples. The coverage of the third rule is determined based at least on the determining the plurality of matches by the third rule to the first samples, the plurality of matches by the third rule to the second samples, and the plurality of non-matches by the third rule to the third samples.

Figure 7:
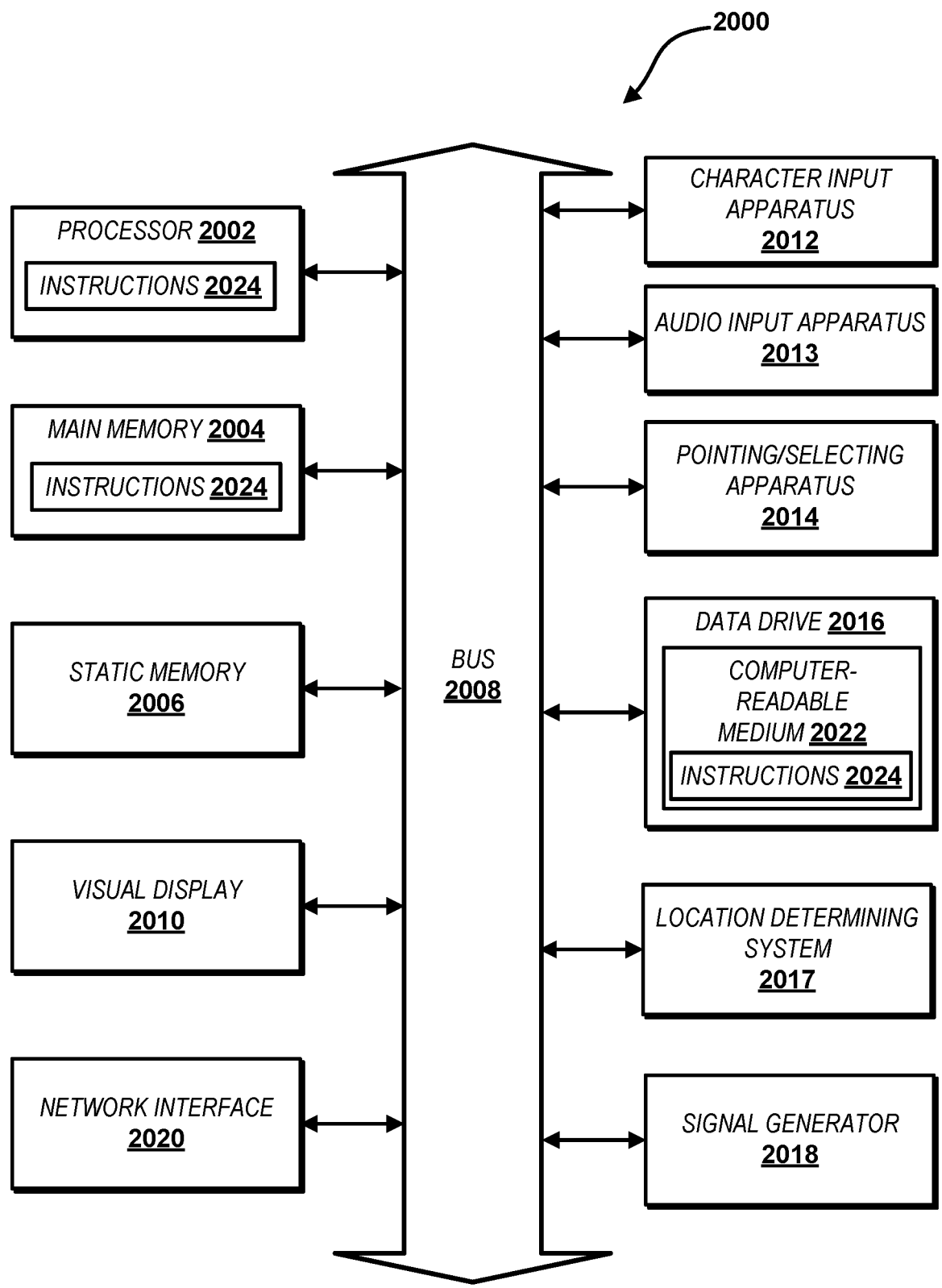
FIG. 7 shows a computer system for performing described methods according to illustrative embodiments.

FIG. 7 illustrates in abstract the function of an exemplary computer system 2000 on which the systems, methods and processes described herein can execute. For example, the computing device 12, security manager 20, web/app servers 40, email provider APIs 44, email servers 72, and data repositories 74 can each be embodied by a particular computer system 2000 or a plurality of computer systems 2000. The computer system 2000 may be provided in the form of a personal computer, laptop, handheld mobile communication device, mainframe, distributed computing system, or other suitable configuration. Illustrative subject matter is in some instances described herein as computer-executable instructions, for example in the form of program modules, which program modules can include programs, routines, objects, data structures, components, or architecture configured to perform particular tasks or implement particular abstract data types. The computer-executable instructions are represented for example by instructions 2024 executable by the computer system 2000.

The computer system 2000 can operate as a standalone device or can be connected (e.g., networked) to other machines. In a networked deployment, the computer system 2000 may operate in the capacity of a server or a client machine in server-client network environment, or as a peer machine in a peer-to-peer (or distributed) network environment. The computer system 2000 can also be considered to include a collection of machines that individually or jointly execute a set (or multiple sets) of instructions to perform one or more of the methodologies described herein, for example in a cloud computing environment.

It would be understood by those skilled in the art that other computer systems including but not limited to networkable personal computers, minicomputers, mainframe computers, handheld mobile communication devices, multiprocessor systems, microprocessor-based or programmable electronics, and smart phones could be used to enable the systems, methods and processes described herein. Such computer systems can moreover be configured as distributed computer environments where program modules are enabled and tasks are performed by processing devices linked through a computer network, and in which program modules can be located in both local and remote memory storage devices.

The exemplary computer system 2000 includes a processor 2002, for example a central processing unit (CPU) or a graphics processing unit (GPU), a main memory 2004, and a static memory 2006 in communication via a bus 2008. A visual display 2010 for example a liquid crystal display (LCD), a light emitting diode (LED) display, or a cathode ray tube (CRT) is provided for displaying data to a user of the computer system 2000. The visual display 2010 can be enabled to receive data input from a user for example via a resistive or capacitive touch screen. A character input apparatus 2012 can be provided for example in the form of a physical keyboard, or alternatively, a program module which enables a user-interactive simulated keyboard on the visual display 2010 and actuatable for example using a resistive or capacitive touchscreen. An audio input apparatus 2013, for example a microphone, enables audible language input which can be converted to textual input by the processor 2002 via the instructions 2024. A pointing/selecting apparatus 2014 can be provided, for example in the form of a computer mouse or enabled via a resistive or capacitive touch screen in the visual display 2010. A data drive 2016, a signal generator 2018 such as an audio speaker, and a network interface 2020 can also be provided. A location determining system 2017 is also provided which can include for example a GPS receiver and supporting hardware.

The instructions 2024 and data structures embodying or used by the herein-described systems, methods, and processes, for example software instructions, are stored on a computer-readable medium 2022 and are accessible via the data drive 2016. Further, the instructions 2024 can completely or partially reside for a particular time period in the main memory 2004 or within the processor 2002 when the instructions 2024 are executed. The main memory 2004 and the processor 2002 are also as such considered computer-readable media.

While the computer-readable medium 2022 is shown as a single medium, the computer-readable medium 2022 can be considered to include a single medium or multiple media, for example in a centralized or distributed database, or associated caches and servers, that store the instructions 2024. The computer-readable medium 2022 can be considered to include any tangible medium that can store, encode, or carry instructions for execution by a machine and that cause the machine to perform any one or more of the methodologies described herein, or that can store, encode, or carry data structures used by or associated with such instructions. Further, the term "computer-readable storage medium" can be considered to include, but is not limited to, solid-state memories and optical and magnetic media that can store information in a non-transitory manner. Computer-readable media can for example include non-volatile memory such as semiconductor memory devices (e.g., magnetic disks such as internal hard disks and removable disks, magneto-optical disks, CD-ROM and DVD-ROM disks, Erasable Programmable Read-Only Memory (EPROM), Electrically Erasable Programmable Read-Only Memory (EEPROM), and flash memory devices).

The instructions 2024 can be transmitted or received over a computer network, for example the computer network 8, using a signal transmission medium via the network interface 2020 operating under one or more known transfer protocols, for example FTP, HTTP, or HTTPs. Examples of computer networks include a local area network (LAN), a wide area network (WAN), the internet, mobile telephone networks, Plain Old Telephone (POTS) networks, and wireless data networks, for example Wi-Fi™ and 3G/4G/5G cellular networks. The term "computer-readable signal medium" can be considered to include any transitory intangible medium that is capable of storing, encoding, or carrying instructions for execution by a machine, and includes digital or analog communications signals or other intangible medium to facilitate communication of such instructions.

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

While embodiments have been described in detail above, these embodiments are non-limiting and should be considered as merely exemplary. Modifications and extensions may be developed, and all such modifications are deemed to be within the scope defined by the appended claims.

What is claimed is:

1. A method comprising:
   monitoring network communications of at least one computing device;
   extracting a first data file based on the monitoring of the network communications of the at least one computing device;
   applying a first rule for identifying application code to the first data file to determine a non-match by the first rule to the first data file, the first rule comprising a plurality of terms and at least one operator;
   applying a second rule for identifying application code to the first data file to determine a match by the second rule to the first data file;
   generating a rule update for identifying application code based at least on the determining the non-match by the first rule to the first data file and the determining the match by the second rule to the first data file;
   generating an abstract syntax tree of the first rule, the abstract syntax tree comprising a plurality of nodes comprising the plurality of terms and the at least one operator;
   incorporating the rule update into a first node of the plurality of nodes to generate a third rule for identifying application code, the first node at a first depth on the abstract syntax tree;
   applying the third rule to a plurality of application code samples to determine a coverage of the third rule;
   monitoring network communications of a particular computing device;
   extracting a second data file based on the monitoring of the network communications of the particular computing device;
   applying, based at least on the coverage of the third rule and the first depth, the third rule to the second data file to determine a match by the third rule to the second data file; and
   at least one of providing a notification, disabling the second data file, blocking the second data file, or deleting the second data file via the particular computing device based on the determining the match by the third rule to the second data file.

2. The method of claim 1, further comprising:
   incorporating the rule update into a second node of the plurality of nodes to generate a fourth rule for identifying application code, the second node at a second depth on the abstract syntax tree;
   applying the fourth rule to the plurality of application code samples to determine a coverage of the fourth rule; and
   applying, further based on the coverage of the fourth rule and the second depth, the third rule to the second data file to determine the match by the third rule to the second data file.

3. The method of claim 2, further comprising:
   comparing the first depth to the second depth to determine the first depth is deeper than the second depth; and
   applying, further based on the determining the first depth is deeper than the second depth, the third rule to the second data file to determine the match by the third rule to the second data file.

4. The method of claim 2, further comprising:
   comparing the coverage of the third rule and the coverage of the fourth rule to determine the coverage of the third rule is equal to the coverage of the fourth rule;
   comparing the first depth to the second depth to determine the first depth is deeper than the second depth; and
   applying, further based on the determining the coverage of the third rule is equal to the coverage of the fourth rule and the determining the first depth is deeper than the second depth, the third rule to the second data file to determine the match by the third rule to the second data file.

5. The method of claim 1, wherein:
   the first node comprises a particular term of the plurality of terms; and
   the incorporating the rule update into the first node comprises applying an OR operator between the particular term and the rule update.

6. The method of claim 1, further comprising:
   extracting a plurality of data files comprising the first data file based on the monitoring of the network communications of the at least one computing device, the plurality of data files comprising the plurality of application code samples;
   applying at least the second rule to the plurality of data files to determine a plurality of matches by the at least the second rule to the plurality of application code samples, the plurality of matches comprising the match by the second rule to the first data file;
   applying the third rule to the plurality of application code samples to determine a plurality of matches by the third rule to the plurality of application code samples; and
   determining the coverage of the third rule based at least on the determining the plurality of matches by the third rule to the plurality of application code samples and the plurality of matches by the at least the second rule to the plurality of application code samples.

7. The method of claim 6, further comprising applying a plurality of rules comprising the second rule to the plurality of data files to determine the plurality of matches by the at least the second rule to the plurality of application code samples.

8. The method of claim 1, further comprising:
   extracting a plurality of data files based on the monitoring of the network communications of the at least one computing device, the plurality of data files comprising the plurality of application code samples, and the plurality of application code samples comprising at least a first sample that is not matched by the first rule and is matched by the second rule, at least a second sample that is matched by the first rule and is matched by the second rule, and at least a third sample that is not matched by the first rule and is not matched by the second rule;

applying the third rule to the plurality of application code samples to determine a match by the third rule to the at least the first sample, a match by the third rule to the at least the second sample, and a non-match by the third rule to the at least the third sample; and determining the coverage of the third rule based at least on the match by the third rule to the at least the first sample, the match by the third rule to the at least the second sample, and the non-match by the third rule to the at least the third sample.

9. The method of claim 8, wherein the plurality of data files comprises the first data file.

10. The method of claim 1, further comprising:

extracting a plurality of data files based on the monitoring of the network communications of the at least one computing device, the plurality of data files comprising the plurality of application code samples;

applying the first rule and the second rule to the plurality of data files to determine first samples of the plurality of application code samples that are not matched by the first rule and are matched by the second rule, to determine second samples of the plurality of application code samples that are matched by the first rule and are matched by the second rule, and to determine third samples of the plurality of application code samples that are not matched by the first rule and are not matched by the second rule;

applying the third rule to the plurality of application code samples to determine a plurality of matches by the third rule to the first samples, a plurality of matches by the third rule to the second samples, and a plurality of non-matches by the third rule to the third samples; and determining the coverage of the third rule based at least on the determining the plurality of matches by the third rule to the first samples, the plurality of matches by the third rule to the second samples, and the plurality of non-matches by the third rule to the third samples.

11. The method of claim 1, wherein the at least one computing device comprises the particular computing device.

12. The method of claim 2, wherein the plurality of application code samples comprise a plurality of known infected samples and a plurality of known non-infected samples, the method further comprising:

determining the third rule matches the plurality of known infected samples and does not match the plurality of known non-infected samples to determine the coverage of the third rule; and determining the fourth rule matches the plurality of known infected samples and does not match the plurality of known non-infected samples to determine the coverage of the fourth rule.

13. A system, comprising:

one or more processors; and memory storing executable instructions that, as a result of being executed, cause the system to perform operations comprising:

monitoring network communications;

extracting a first data file via the monitoring;

applying a first rule for identifying application code to the first data file to determine a non-match by the first rule to the first data file, the first rule comprising a plurality of terms and at least one operator;

applying a second rule to the first data file to determine a match by the second rule to the first data file;

generating a rule update for identifying application code based at least on the determining the non-match by the first rule to the first data file and the determining the match by the second rule to the first data file;

generating an abstract syntax tree of the first rule, the abstract syntax tree comprising a plurality of nodes comprising the plurality of terms and the at least one operator;

incorporating the rule update into a first node of the plurality of nodes to generate a third rule for identifying application code, the first node at a first depth on the abstract syntax tree;

applying the third rule to a plurality of application code samples to determine a coverage of the third rule;

extracting a second data file via the monitoring;

applying, based at least on the coverage of the third rule and the first depth, the third rule to the second data file to determine a match by the third rule to the second data file; and at least one of providing a notification, disabling the second data file, blocking the second data file, or deleting the second data file based on the determining the match by the third rule to the second data file.

14. The system of claim 13, the executable instructions, as a result of being executed, further causing the system to perform operations comprising:

incorporating the rule update into a second node of the plurality of nodes to generate a fourth rule for identifying application code, the second node at a second depth on the abstract syntax tree;

applying the fourth rule to the plurality of application code samples to determine a coverage of the fourth rule; and applying, further based on the coverage of the fourth rule and the second depth, the third rule to the second data file to determine the match by the third rule to the second data file.

15. The system of claim 13, the executable instructions, as a result of being executed, further causing the system to perform operations comprising:

extracting a plurality of data files comprising the first data file via the monitoring, the plurality of data files comprising the plurality of application code samples, and the plurality of application code samples comprising at least a first sample that is not matched by the first rule and is matched by the second rule, at least a second sample that is matched by the first rule and is matched by the second rule, and at least a third sample that is not matched by the first rule and is not matched by the second rule;

applying the third rule to the plurality of application code samples to determine a match by the third rule to the at least the first sample, a match by the third rule to the at least the second sample, and a non-match by the third rule to the at least the third sample; and determining the coverage of the third rule based at least on the match by the third rule to the first sample, the match by the third rule to the at least the second sample, and the non-match by the third rule to the at least the third sample.

16. A non-transitory computer-readable storage medium storing executable instructions that, as a result of execution by one or more processors of a computer system, cause the computer system to:

monitor network communications;

extract a first data file via the monitoring;

apply a first rule for identifying application code to the first data file to determine a non-match by the first rule to the first data file, the first rule comprising a plurality of terms and at least one operator;

apply a second rule to the first data file to determine a match by the second rule to the first data file;

generate a rule update for identifying application code based at least on the determining the non-match by the first rule to the first data file and the determining the match by the second rule to the first data file;

generate an abstract syntax tree of the first rule, the abstract syntax tree comprising a plurality of nodes comprising the plurality of terms and the at least one operator;

incorporate the rule update into a first node of the plurality of nodes to generate a third rule for identifying application code, the first node at a first depth on the abstract syntax tree;

apply the third rule to a plurality of application code samples to determine a coverage of the third rule;

extract a second data file via the monitoring;

apply, based at least on the coverage of the third rule and the first depth, the third rule to the second data file to determine a match by the third rule to the second data file; and at least one of provide a notification, disable the second data file, block the second data file, or delete the second data file based on the determining the match by the third rule to the second data file.

17. The non-transitory computer-readable storage medium of claim 16, the executable instructions, as a result of execution by the one or more processors of the computer system, further causing the computer system to:

incorporate the rule update into a second node of the plurality of nodes to generate a fourth rule for identifying application code, the second node at a second depth on the abstract syntax tree;

apply the fourth rule to the plurality of application code samples to determine a coverage of the fourth rule;

compare the first depth to the second depth to determine the first depth is deeper than the second depth; and apply, further based on the coverage of the fourth rule and the determining the first depth is deeper than the second depth, the third rule to the second data file to determine the match by the third rule to the second data file.

\* \* \* \* \*